United States Patent
Thomas et al.

(10) Patent No.: US 7,152,100 B2
(45) Date of Patent: Dec. 19, 2006

(54) SYSTEM AND METHOD FOR PROVISIONING NETWORK ACCESS DEVICES

(75) Inventors: H. Keith Thomas, Sugar Hill, GA (US); Douglas T. Albright, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 885 days.

(21) Appl. No.: 10/191,480

(22) Filed: Jul. 9, 2002

(65) Prior Publication Data

US 2004/0010569 A1  Jan. 15, 2004

(51) Int. Cl.
*G06F 15/177* (2006.01)

(52) U.S. Cl. .................. 709/220; 709/221; 709/222; 709/227; 709/228

(58) Field of Classification Search ............... 709/220, 709/221, 222, 223, 225, 227–228
See application file for complete search history.

(56) References Cited

U.S. PATENT DOCUMENTS

| | | | |
|---|---|---|---|
| 5,535,336 A | 7/1996 | Smith et al. | 395/200.06 |
| 5,574,723 A * | 11/1996 | Killian et al. | 370/384 |
| 5,650,994 A | 7/1997 | Daley | 370/259 |
| 5,708,656 A | 1/1998 | Noneman et al. | 370/320 |
| 5,864,758 A * | 1/1999 | Moon | 455/424 |
| 5,870,667 A | 2/1999 | Globuschutz | 455/67.1 |
| 6,069,944 A | 5/2000 | Cretch | 379/210 |
| 6,122,362 A | 9/2000 | Smith et al. | 379/230 |
| 6,243,747 B1 * | 6/2001 | Lewis et al. | 709/220 |
| 6,243,759 B1 | 6/2001 | Boden et al. | 709/238 |
| 6,308,205 B1 | 10/2001 | Carcerano et al. | 709/221 |
| 6,330,586 B1 * | 12/2001 | Yates et al. | 709/201 |
| 6,345,294 B1 * | 2/2002 | O'Toole et al. | 709/222 |
| 6,360,260 B1 * | 3/2002 | Compliment et al. | 709/224 |
| 6,385,648 B1 | 5/2002 | Philippou et al. | 709/222 |
| 6,560,604 B1 | 5/2003 | Fascenda | 707/10 |
| 6,606,670 B1 * | 8/2003 | Stoneking et al. | 710/14 |
| 6,615,258 B1 | 9/2003 | Barry et al. | 709/223 |
| 6,633,899 B1 * | 10/2003 | Coward | 709/202 |
| 6,684,241 B1 * | 1/2004 | Sandick et al. | 709/220 |
| 6,717,919 B1 * | 4/2004 | Ketcham et al. | 370/255 |
| 6,725,260 B1 * | 4/2004 | Philyaw | 709/220 |
| 6,834,303 B1 | 12/2004 | Garg et al. | 709/224 |
| 6,853,841 B1 | 2/2005 | St. Pierre | 455/420 |
| 6,868,444 B1 | 3/2005 | Kim et al. | 709/223 |
| 6,895,431 B1 | 5/2005 | Bero | 709/220 |
| 6,938,089 B1 * | 8/2005 | Slaby et al. | 709/229 |
| 2002/0161867 A1 * | 10/2002 | Cochran et al. | 709/221 |

* cited by examiner

*Primary Examiner*—Zarni Maung
*Assistant Examiner*—Van Kim T. Nguyen
(74) *Attorney, Agent, or Firm*—Thomas, Kayden, Horstemeyer & Risley, L.L.P.

(57) ABSTRACT

A system for provisioning a network access device based on control settings received from a remote location utilizes logic and memory for storing a set of operational control settings and a set of default control settings for the network access device. The logic is configured to store, in the memory, the operational control settings based on data received from a remote device via a network. The logic is configured to control the network access device based on the operational control settings and to begin controlling the network access device based on the default control settings in lieu of the operational control settings in response to a determination that the network access device is unable to communicate over the network based on the operational control settings, thereby enabling the network access device to be remotely re-provisioned.

31 Claims, 7 Drawing Sheets

SYSTEM AND METHOD FOR PROVISIONING NETWORK ACCESS DEVICES

BACKGROUND OF THE INVENTION

1. Field of the Invention

The present invention generally relates to communication networks and, in particular, to a system and method for provisioning network access devices based on control settings received from remote locations.

2. Related Art

In many communication environments, data from various communication equipment (e.g., personal computers, telephones, fax machines, a local area network, etc.) located at a customer's premises may be communicated over a common network connection, sometimes referred to as a "subscriber line." In such environments, a network access device often terminates the subscriber line and operates as an interface between the subscriber line and the customer's communication equipment.

During operation, the network access device receives data from the customer's communication equipment and transmits the data to a wide area network (WAN) over the subscriber line. The network access device often utilizes various multiplexing techniques, such as time division multiplexing or frequency division multiplexing, for example, to enable the network access device to concurrently communicate data from various sources.

The network access device also receives multiplexed data from the subscriber line. This data is normally destined for one or more communication devices included in the communication equipment residing at the customer's premises. The network access device demultiplexes the data received from the subscriber line and then provides the data to the appropriate destination device. Note that, in communicating data between the subscriber line and the customer's communication equipment, the network access device may utilize various communication and networking protocols, such as frame relay or Internet Protocol (IP), for example.

Moreover, different network access devices servicing different customers are often configured differently based on the individual needs of the corresponding customer and the types of communication services being provided to the corresponding customer. For example, a network access device may be configured differently depending on the number and the types of communication devices to be serviced by the network access device. Furthermore, the transmission speed of a network access device may be set based on communication limitations of the communication equipment at the customer's premises, limitations of the subscriber line, and/or bandwidth contracted for by the customer. Indeed, there are a variety of reasons why different network access devices are configured differently. Thus, when installing a network access device, a network service provider often manipulates the configuration of the network access device or, in other words, provisions the network access device such that the configuration of the network access device is tailored to the specific needs or desires of the customer.

In this regard, to install a network access device, a trained technician capable of appropriately provisioning the network access device typically travels to a customer's premises. The technician then connects the network access device to a subscriber line and provisions the network access device according to the needs of the customer, the services contracted for by the customer, the capabilities of the subscriber line, and/or the needs of the service provider to monitor and service the network access device.

The provisioning process usually entails the setting of control values or settings within the network access device. For example, based on tests performed by the technician, the technician may determine an optimal line speed for the network access device, and/or the customer may have specifically contracted for a specific WAN bandwidth for the network access device. Based on the foregoing, the technician may then set, in a control register, a value indicative of an operational line speed or bandwidth for the network access device. During operation, the network access device may utilize this value in order to establish the communication speed or bandwidth of the network access device. Note that various other techniques for provisioning the network access device may be employed by the technician in other examples. Moreover, techniques for provisioning network access devices are generally well-known and will not be described in significant detail herein.

Unfortunately, the costs associated with sending a trained technician to each customer's site in order to provision network access devices can be quite expensive to a network service provider. Furthermore, if a network access device is not provisioned correctly, re-provisioning costs, in many instances, are prohibitive. In this highly competitive space, network service providers are currently searching for various techniques to help reduce provisioning and re-provisioning expenses.

SUMMARY OF THE INVENTION

The present invention overcomes the inadequacies and deficiencies of the prior art as discussed hereinbefore. Generally, the present invention provides a system and method for provisioning network access devices based on control settings received from remote locations.

A system in accordance with an exemplary embodiment of the present invention utilizes a network access device having logic and memory for storing a set of operational control settings and a set of default control settings for the network access device. The logic is configured to store, in the memory, the operational control settings based on data received from a remote device via a network. The logic is configured to control the network access device based on the operational control settings and to begin controlling the network access device based on the default control settings in lieu of the operational control settings in response to a determination that the network access device is unable to communicate over the network based on the operational control settings, thereby enabling the network access device to be remotely re-provisioned.

The present invention can also be viewed as providing a method for provisioning network access devices based on control settings received from remote locations. The method can be broadly conceptualized by the following steps: provisioning a network access device based on data communicated to the network access device via communication between the network access device and a remote device over a network thereby establishing an operational configuration for the network access device; attempting to establish communication between the network access device and a remote device over the network according to the operational configuration established in the provisioning step; automatically implementing a predefined configuration for the network access device if the attempted communication is unsuccessful; establishing communication between the network access device and a remote device over the network according to the predefined configuration implemented in the implementing step; and re-provisioning the network access device based on data communicated to the network access device via the communication established in the establishing step.

Various features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

The present invention generally pertains to a system and method for provisioning network access devices based on control settings from remote locations. Once connected to a subscriber line, a network access device in accordance with an exemplary embodiment of the present invention communicates with a remote communication device, and the operational control settings of the network access device are set via data transmitted from the remote communication device. Thus, it is not necessary for a person who physically installs the network access device to possess the knowledge necessary to provision the network access device nor to spend additional time on site for provisioning the device and verifying its correctness, thereby helping to reduce costs associated with providing communication services to customers.

In this regard, instead of sending, to a customer's premises, a technician trained to install and provision a network access device, a service provider may send an unskilled employee who physically installs the network access devices. If desired, this employee, before leaving the customer's premises, may also power up the network device and verify that it connects to the subscriber line. The installed network access devices may then be efficiently provisioned by a trained technician at a remote location without the trained technician having to travel to the customer's premises. Indeed, it may even be possible for customers to install the network access devices thereby eliminating the need of the service provider to send any employees to the customers' premises for the purposes of installing or provisioning network access devices.

Figure 1:
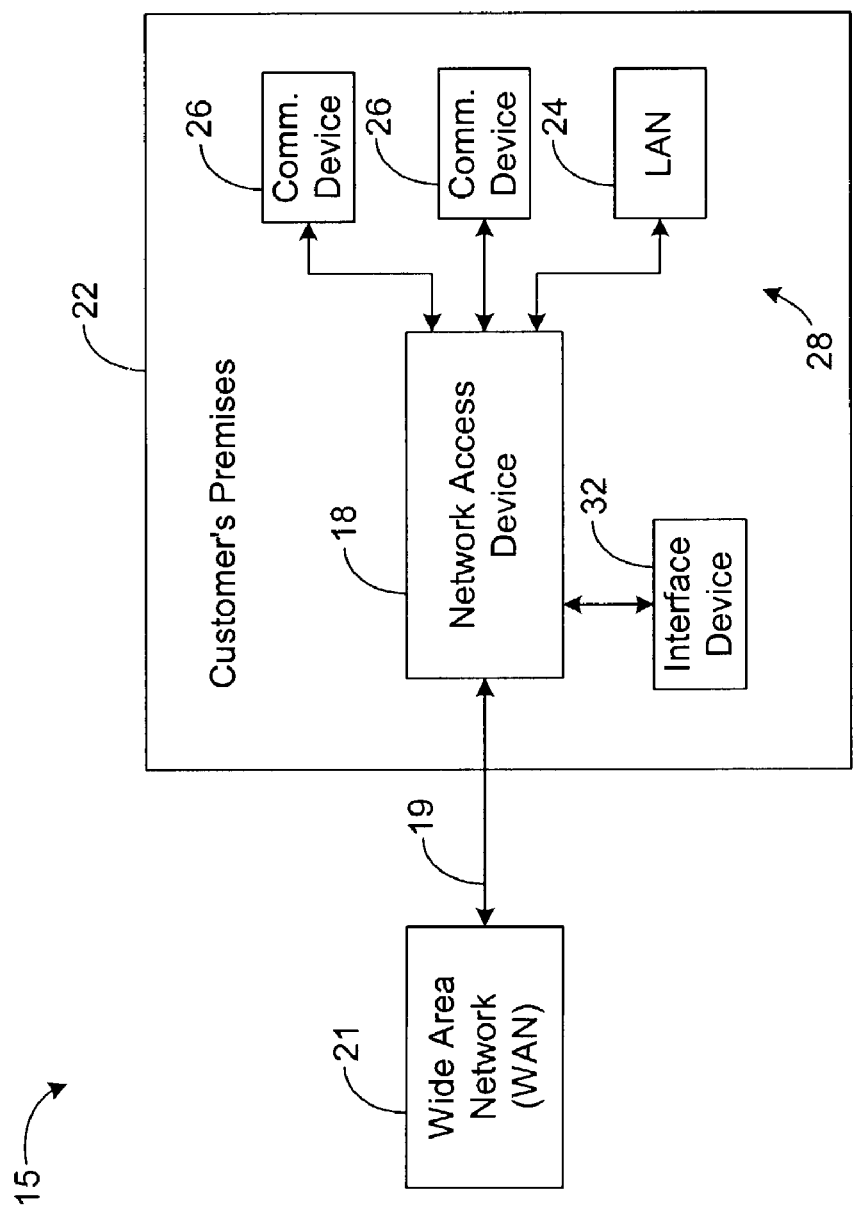
FIG. 1 is a block diagram illustrating a conventional communication system.

To better understand the features and benefits of the present invention, it may be helpful to first examine a conventional communication system 15, which is depicted by FIG. 1. As shown by FIG. 1, the system 15 includes a network access device 18 interfaced with a wide area network (WAN) 21, such as the Publicly Switched Telephone Network (PSTN) or the Internet, for example, via a communication connection 19, which is sometimes referred to as a "subscriber line." The network access device 18 is normally located at a customer's premises 22 and is connected to a local area network (LAN) 24 and/or one or more communication devices 26, such as personal computers, telephones, fax machines, modems, etc., at the customer's premises 22. The communication devices 26 and the LAN 24 will be collectively referred to as the "local equipment 28."

The network access device 18 serves as an interface between the subscriber line 19 and the local equipment 28. In this regard, the network access device 18 receives and, if necessary, decodes signals from the subscriber line 19. Furthermore, if these signals are multiplexed, the network access device 18 demultiplexes the received signals and interfaces data from the signals with the local equipment 28. The network access device 18 also receives signals from the local equipment 28. If necessary, the device 18 encodes and/or multiplexes the signals from the local equipment 28 and transmits these signals across the subscriber line 19 to the WAN 21.

Before communication between the local equipment 28 and the WAN 21 is enabled, a service provider usually sends a trained technician to the premises 22 for installing and provisioning the network access device 18. In this regard, to install the device 18, the technician normally connects the subscriber line 19 and the local equipment 28 to communication ports located on the device 18 thereby enabling the network access device 18 to exchange data with the WAN 21 and the local equipment 28. After installing the network access device 18, the technician then provisions the device 18 by adjusting the control settings of the device 18 based on the services desired or needed by the customer and based on the communication environment in which the network access device 18 is to operate.

To this end, the technician may connect a user interface device 32 to a communication port of the network access device 18 and utilize the user interface device 32 to exchange data with the network access device 18. The technician may then utilize the interface device 32 to set control settings within the network access device 18 for controlling the type of communication to be employed by the device 18 during operation. For example, the technician may adjust the control settings in order to control the type of protocol that is employed by the network access device. The technician may also adjust the control settings to control the bandwidth or the line speed of the network access device 18. In adjusting the control settings, the technician may utilize information gathered via the interface device 32 or otherwise while at the customer's premises 22.

For example, the technician may program the network access device 18 with a public Internet Protocol (IP) address determined by the service provider and then configure the device 18 to use Network Address Translation (NAT) so that the addresses of the local equipment 28 are kept private. As known in the art, the technician may adjust various other settings of the network access device 18 in order to appropriately provision the network access device 18 according to the needs and/or desires of the customer.

After the network access device 18 is installed and provisioned by the technician, the network access device 18 is able to interface signals between the subscriber line 19 and the local equipment 28. If desired, the technician may disconnect the interface device 32 from the network access device 18 before leaving the premises 22 and then later utilize the interface device 32 to provision another network access device (not specifically shown). Unfortunately, the burden and expense associated with sending a trained technician who is capable of provisioning network access devices 18 to the premises 22 of different customers can be quite large, and network service providers are presently searching for ways to reduce such costs.

Figure 2:
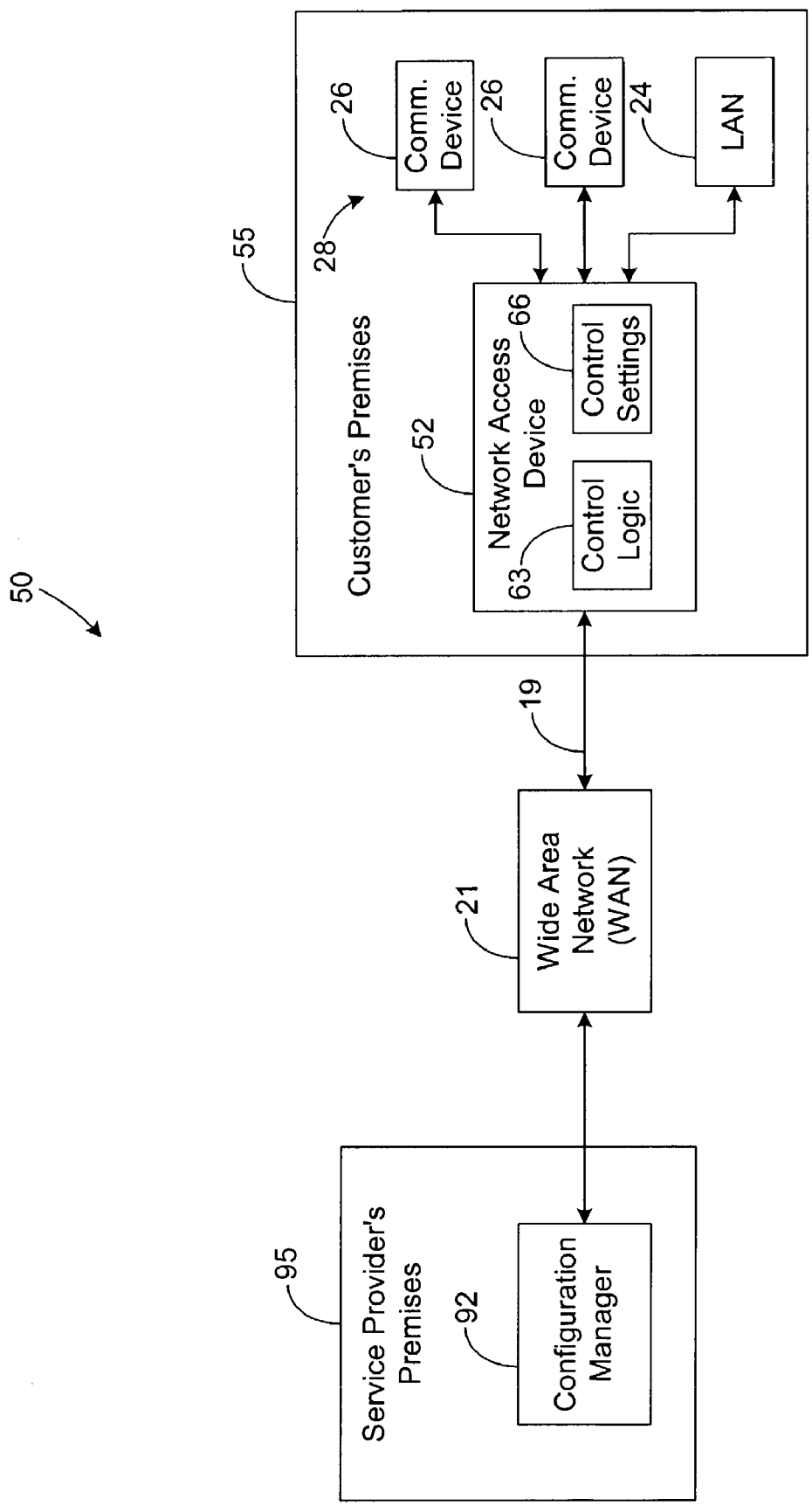
FIG. 2 is a block diagram illustrating a communication system in accordance with an exemplary embodiment of the present invention.

A communication system in accordance with the present invention allows a network access device to be remotely provisioned thereby helping to reduce the costs associated with provisioning the network access device. A system 50 in accordance with a preferred embodiment of the present invention is depicted in FIG. 2. As depicted by FIG. 2, the system 50 comprises a network access device 52 residing at a customer's premises 55. The network access device 52 is configured to interface signals received from the WAN 21 with local equipment 28 (e.g., LAN 24 and/or one or more communication devices 26) residing at the customer's premises 55.

In the embodiment shown by FIG. 2, the network access device 52 is connected to the WAN 21 via subscriber line 19. Note that, in some embodiments, it is possible for the subscriber line 19 to be a wireless link between the network access device 52 and the WAN 21. Furthermore, after the network access device 52 is provisioned, techniques utilized by the network access device 52 to interface signals between the WAN 21 and the local equipment 28 may be similar to or identical to the techniques employed by the conventional network access device 18 of FIG. 1.

As shown by FIG. 2, the network access device 52 preferably comprises control logic 63 that is designed to control the operation of the device 52 based, in part, on control settings 66 stored in the device 52. The control logic 63 can be implemented in software, hardware, or a combination thereof. In the preferred embodiment, as illustrated by way of example in FIG. 3, the control logic 63, along with its associated methodology, is implemented in software and stored in memory 68 of the network access device 52.

Note that the control logic 63, when implemented in software, can be stored and transported on any computer-readable medium for use by or in connection with an instruction execution system, apparatus, or device, such as a computer-based system, processor-containing system, or other system that can fetch and execute instructions. In the context of this document, a "computer-readable medium" can be any means that can contain, store, communicate, propagate, or transport a program for use by or in connection with the instruction execution system, apparatus, or device. The computer readable-medium can be, for example but not limited to, an electronic, magnetic, optical, electromagnetic, infrared, or semiconductor system, apparatus, device, or propagation medium. More specific examples (a nonexhaustive list) of the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. As an example, the control logic 63 may be magnetically stored and transported on a conventional portable computer diskette.

Figure 3:
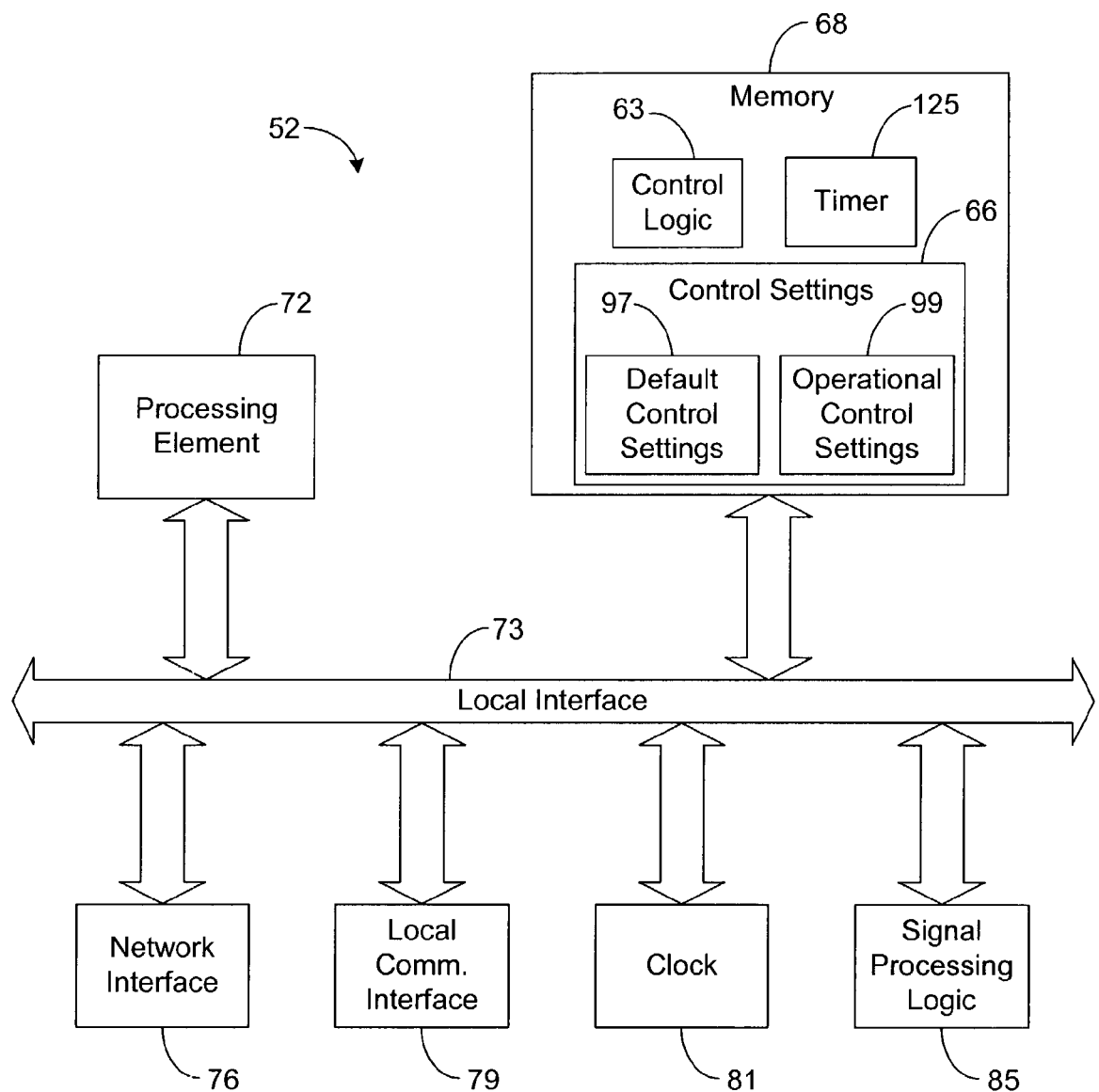
FIG. 3 is a block diagram illustrating a more detailed view of a network access device depicted in FIG. 2.

The preferred embodiment of the network access device 52 of FIG. 3 comprises one or more conventional processing elements 72, such as a digital signal processor (DSP) or a central processing unit (CPU), that communicate to and drive the other elements within the device 52 via a local interface 73, which can include one or more buses. Furthermore, the network access device 52 also comprises a network interface 76 that allows the device 52 to exchange data with the WAN 21 (FIG. 2) and a local communication interface 79 that allows the device 52 to exchange data with the local equipment 28 (e.g., the LAN 24 and/or one or more communication devices 26). The preferred embodiment of the network access device 52 also comprises a clock 81 that allows the control logic 63 to track time and/or to control timing operations performed within the device 52.

As shown by FIG. 3, the network access device 52 preferably comprises signal processing logic 85 operating under the direction and control of the control logic 63 and based on control settings 66 for processing or conditioning the signals received from the WAN 21 (FIG. 2) and/or the local equipment 28. As an example, the signal processing logic 85 may perform encoding/decoding and/or multiplexing/demultiplexing among other signal processing functions typically performed by conventional network access devices 18 (FIG. 1). Note that the signal processing logic 85 may be implemented in software, hardware, or a combination thereof, and in the embodiment shown by FIG. 3, the signal processing logic 85 is implemented in hardware and interfaced with the local interface 73. In other embodiments, portions of the signal processing logic 85 may be implemented in software and stored on a computer-readable medium, if desired.

In the preferred embodiment, a user, such as an employee of a network service provider or the customer of such a provider, installs the network access device 52 at the customer's premises 55. In this regard, the user preferably enables the network access device 52 to exchange data with the WAN 21 and the local equipment 28 by, for example, connecting the network interface 76 to the subscriber line 19 and by connecting the local communication interface 79 to the local equipment 28. Then, the user "turns on" the device 52 by, for example, activating a power switch or some other type of switch that initiates operation.

In response, the control logic 63 causes the device 52 to enable a communication with a configuration manager 92 (FIG. 2) that is located remotely from the premises 55. As shown by FIG. 3, the control settings 66 preferably comprise default control settings 97 that define a predefined or default configuration for the device 52. The control logic 63 preferably utilizes the default control settings 97 to establish communication parameters (e.g., bandwidth, line speed, protocols, etc.) for the device 52 thereby enabling the device 52 to communicate with the manager 92. When operating under the control of the default control settings 97, in the preferred embodiment, the network access device 52 employs point-to-point protocol (PPP) to communicate with the WAN 21. However, in other embodiments, other methodologies, such as Frame Relay or ATM, for example, may be utilized to communicate with the WAN 21.

Utilizing PPP or some other suitable protocol, such as Dynamic Host Configuration Protocol (DHCP), for example, the network access device 52 preferably communicates with the WAN 21 to obtain its IP address. In obtaining its IP address, the network access device 52 may employ IP control protocol (IPCP) or some other suitable protocol. Techniques for providing IP addresses to network access devices, such as device 52, by network service providers are generally well-known and will not be described in significant detail herein.

Furthermore, a dedicated connection may be provided over the WAN 21 for enabling communication between the configuration manager 92 and the network access device 52. This dedicated WAN connection may be manually or automatically provided by a network services provider before or after the user installs the network access device 52 at the customer's premises 55, and either the configuration manager 92 or the network access device 52 may initiate a communication session over this dedicated connection.

In the preferred embodiment, the network access device 52 and the configuration manager 92 utilize telnet messaging to communicate during the communication session between the network access device 52 and the configuration manager 92, although other types of protocols may be utilized in other embodiments. Furthermore, during the communication session, the configuration manager 92 preferably provisions the network access device 52 by transmitting, to the device 52, data for appropriately setting or defining operational control settings 99 (FIG. 3) according to the needs or desires of the customer to be serviced by the device 52. In this regard, a trained technician at the premises 95 of the configuration manager 92 may utilize the manager 92 to remotely provision the device 52 similar to how a trained technician may utilize the interface device 32 to provision the conventional network access device 18 of FIG. 1. Alternatively, the configuration manager 92 may be configured to automatically communicate with the device 52 and to automatically provision the device 52, as will be described in further detail below.

Figure 4:
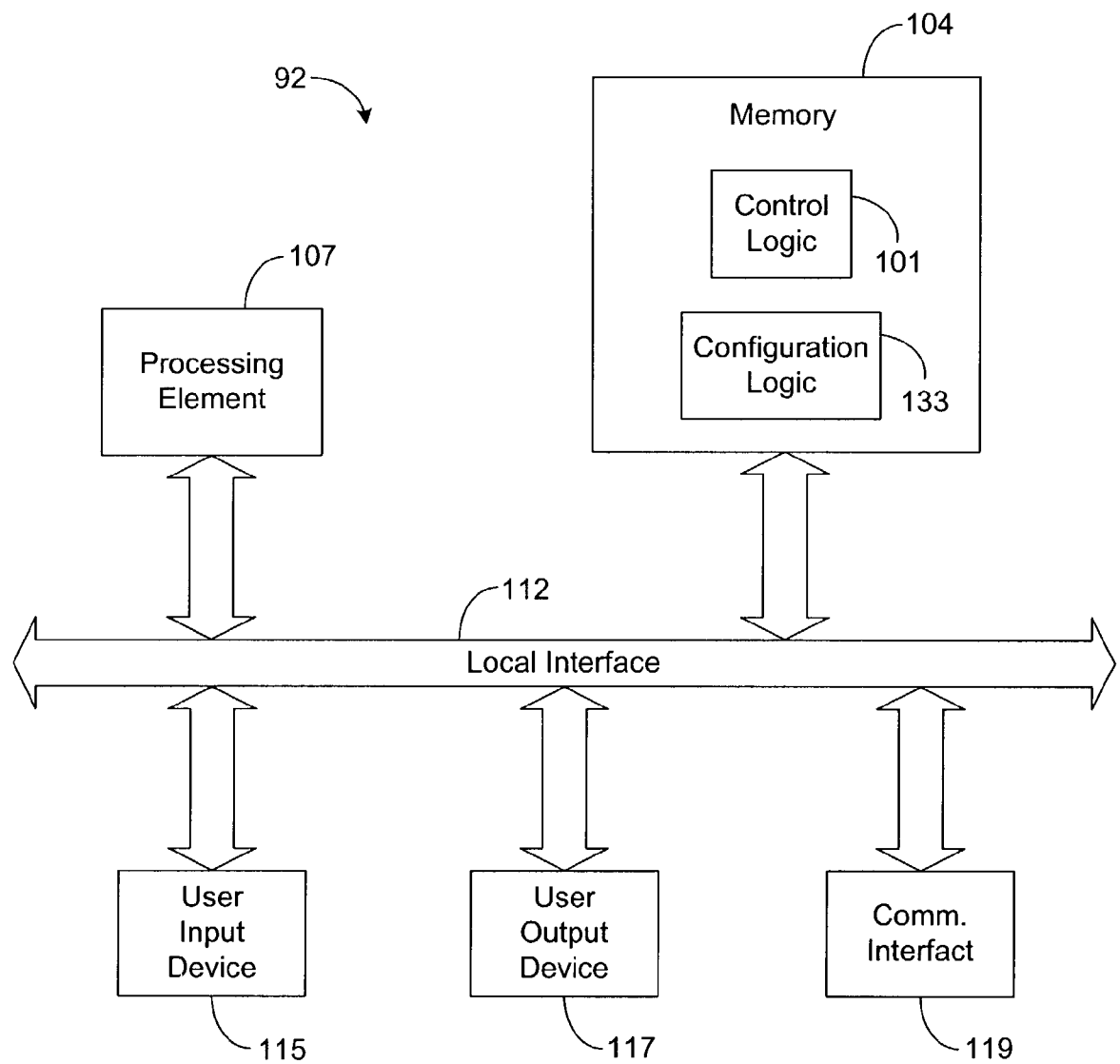
FIG. 4 is a block diagram illustrating a more detailed view of a configuration manager depicted in FIG. 2.

As shown by FIG. 4, the configuration manager 92 may comprise control logic 101 for controlling the general operation of the configuration manager 92. The control logic 101 may be implemented in software, hardware, or a combination thereof. In the embodiment depicted by FIG. 4, the control logic 101 is implemented in software and stored in the memory 104 of the configuration manager 92.

The preferred embodiment of the configuration manager 92 of FIG. 4 comprises one or more conventional processing elements 107, such as a digital signal processor (DSP) or a central processing unit (CPU), that communicate to and drive the other elements within the manager 92 via a local interface 112, which can include one or more buses. Furthermore, the configuration manager 92 also comprises a user input device 115, for example, a keyboard or a mouse, that allows a user to input data into the manager 92, and the configuration manager 92 comprises an output device 117, for example, a display screen or a printer, that allows the manager 92 to output data to the user. The configuration manager 92 also preferably comprises a communication interface 119 that allows the manager 92 to exchange data with the network access device 52 via the WAN 21 (FIG. 2). Note that the communication interface 119 may comprise any device or devices capable of communicating with the WAN 21.

In the preferred embodiment, the control logic 63 of the network access device 52 may be configured to obtain certain information to help the user of the manager 92 to determine how the device 52 should be provisioned. For example, the control logic 63 may be configured to transmit, to the manager 92, information indicative of the number of ports in the local communication interface 79 that have been connected to local equipment 28. The control logic 63 may be configured to negotiate with the local equipment 28 coupled to it and, based on this negotiation, may provide the manager 92 with information indicative of the type of equipment 28 that is coupled to the device 52. Note that the control logic 63 may provide the manager 92 with other types of information that may be used to determine how the device 52 should be provisioned.

The control logic 101 of the manager 92 may be configured to display, via the output device 117, the foregoing information provided to the manager 92 by the network access device 52. The user may view this information and, based on this information or otherwise, the user preferably determines how the network access device 52 is to be provisioned. The user then enters commands for causing the control logic 101 to remotely provision the network access device 52. In this regard, the control logic 101 transmits, to the network access device 52 in response to user inputs, data and/or commands that cause the control logic 63 of the device 52 to set or define the operational control settings 99 for enabling the device 52 to operate in a desired manner based on these settings 99. In other words, the user of the configuration manager 92 remotely provisions the network access device 52.

At some point during the communication session between the network access device 52 and the configuration manager 92, the configuration manager 92 preferably activates a timer 125 (FIG. 3) within the network access device 52. The control logic 101 of the configuration manager 92 may be configured to automatically activate the timer 125 or may activate the timer in response to a command submitted by the user of the manager 92. In the preferred embodiment, the timer 125 is implemented in software, as shown by FIG. 3. However, the timer 125 may be implemented in hardware or a combination of hardware and software in other embodiments. The operation of the timer 125 will be described in more detail hereafter.

Once the network access device 52 is initially provisioned, as described above, the communication session between the network access device 52 and the configuration manager 92 is preferably terminated. Upon termination of the communication session, the control logic 63 begins to utilize the operational control settings 99, as established via the remote provisioning performed by the configuration manager 92, rather than the default control settings 97 to control the operation of the device 52. At this point, the network access device 52 should be capable of independently operating as an interface between the WAN 21 and the local equipment 28 based on the operational control settings 99.

However, due to errors within the device 52 or errors in provisioning the device 52, the device 52 may fail to operate correctly. As such, it may be desirable to change the configuration of the network access device 52 or, in other words, re-provision the device 52. However, the foregoing errors may prevent the device 52 from successfully communicating with the configuration manager 92 or other remote device in order to allow the manager 92 or other remote device to re-provision the device 52. In such a case, a trained technician may travel to the premises 55 and re-provision the device 52 via techniques similar to those described above for provisioning the conventional network access device 18 of FIG. 1. However, having a trained technician travel to the premises 55 for re-provisioning the device 52 can be expensive and/or burdensome.

Moreover, the network access device 52 of the preferred embodiment addresses this problem by enabling a remote device, such as the configuration manager 92, to re-provision the device 52 remotely. In this regard, if the network access device 52 is unable to successfully communicate with the WAN 21 after its initial provisioning, the network access device 52 preferably enables communication with the configuration manager 92 via techniques similar to those described above when the device 52 originally communicated with the manager 92 during the initial provisioning. In other words, the network access device 52 quits attempting to communicate according to the configuration initially provisioned by the manager 92 and enables communication with the manager 92 according to the original configuration of the device 52 (i.e., the configuration that enabled the device 52 to communicate with the manager 92 during the initial provisioning). In the preferred embodiment, the control logic 63 performs the foregoing by transitioning from utilizing the operational control settings 99 to utilizing the default control settings 97 to control the device 52.

Once the network access device 52 has transitioned to its default control settings 97, communication between the network access device 52 and configuration manager 92 is preferably re-established. Either the network access device 52 or the configuration manager 92 may initiate this communication. Once communication between the network access device 52 and the configuration manager 92 has been re-established, the manager 92 may re-provision the device 52. During re-provisioning, the network access device 52 may communicate, to the manager 92, information indicative of its configuration and/or its operational performance. This information may be displayed to the user of the configuration manager 92 in order to help the user to discover the source of the problem that prevented the network access device 52 from successfully communicating after the initial provisioning.

Note that there are several methodologies that may be used to enable the network access device 52 to determine when it should revert to using the default control settings 97. For example, the network access device 52 may be configured to attempt communication with a remote device, such as the configuration manager 92, after the device 52 has been initially provisioned. If the network access device 52 is unable to establish communication with the remote device, then the network access device 52 may be configured to establish communication with the manager 92 for re-provisioning according to the techniques previously used to communicate with the manager 92 during the initial provisioning. That is, if the network access device 52 determines that it is unable to successfully communicate according to its operational configuration, the network access device 52 may be configured to communicate with the manager 92 using the default control settings 97.

However, in the preferred embodiment, the timer 125 is utilized to determine whether the network access device 52 is to revert to its default control settings 97 to allow re-provisioning by the configuration manager 92. In this regard, the timer 125 is preferably configured to generate an interrupt after a specified amount of time has elapsed since the timer's activation, provided that the timer 125 is not deactivated prior to the interrupt. The specified amount of time is preferably set such that the interrupt is not generated until the configuration manager 92 has been provided a sufficient amount of time to establish communication with the device 52 and to deactivate the timer 125 after the initial provisioning of the device 52 has been completed. Note that the specified amount of time may be set by the configuration manager 92 or may be stored in the memory 68 of the device 52 before the provisioning of the device 52 by the manager 92.

Moreover, once the device 52 has been provisioned by the configuration manager 92, communication between the configuration manager 92 and the network access device 52, which is now preferably operating according to its provisioned configuration (i.e., based on the operational control settings 99), is attempted. This communication may be initiated by the network access device 52 or the configuration manager 92. If the manager 92 is able to successfully communicate with the network access device 52, then the provisioning of the device 52 has been successful, and there is no need to re-provision the device 52. Therefore, the manager 92 deactivates the timer 125 by transmitting a deactivation command to the control logic 63. In response to the deactivation command, the control logic 63 prevents the timer 125 from generating the aforedescribed interrupt. As a result, the timer 125 fails to generate an interrupt that causes the network access device 52 to revert to its default control settings 97.

However, if the configuration manager 92 is unable to communicate with the network access device 52 after the initial provisioning performed by the manager 92, then the initial provisioning was unsuccessful. Therefore, re-provisioning the network access device 52 is desirable. Moreover, when the manager 92 is unable to successfully communicate with the network access device 52, the manager 92 fails to deactivate the timer 125, and the timer 125 eventually generates the aforedescribed interrupt.

In response to the interrupt, the control logic 63 of the network access device 52 reverts back to its original configuration in order to enable re-provisioning by the configuration manager 92, as described above. In reverting back to its original configuration, the control logic 63 preferably begins to utilize the default control settings 97 rather than the operational control settings 99 to control the operation of the device 52. Accordingly, communication with the device 52 should be enabled, and the configuration manager 92 should be able to successfully re-provision the network access device 52, thereby potentially eliminating the need to send a trained technician to the premises 55 in order to re-provision the device 52.

Note that the provisioning of the network access device 52 by the configuration manager 92 may be generally controlled by a user of the configuration manager 92, as described above. However, in some embodiments, the configuration manager 92 may be configured to automatically provision and/or re-provision the network access device 52. In this regard, the configuration manager 92 may comprise configuration logic 133, as shown by FIG. 4, configured to provision and/or re-provision the network access device 52. The configuration logic 133 maybe implemented in software, hardware, or a combination thereof, and in the embodiment shown by FIG. 4, the control logic 133 is implemented in software and stored in memory 104.

If desired, the configuration logic 133 may be programmed to automatically provision the network access device 52 in a desirable manner. The provisioning performed by the configuration logic 133 may be based on information transmitted to the configuration manager 92 by the network access device 52. Further, in re-provisioning the network access device 52, the configuration logic 133 may be configured to analyze information from the network access device 52 in an attempt to diagnose the operational problems associated with the network access device 52. If the configuration logic 133 can diagnose such problems, the configuration logic 133 can be programmed to automatically re-provision the device 52 in a manner that overcomes the operational problems.

In addition, it should be noted that it is not necessary for the network access device 52 to communicate with the same configuration manager 92 for both the initial provisioning and the re-provisioning described above. In this regard, the network access device 52 may communicate with a first configuration manager 92 for its initial provisioning and may communicate with an entirely different configuration manager 92 for re-provisioning. Furthermore, it is not necessary for the same configuration manager 92 that initially provisioned the device 52 to be responsible for deactivating the timer 125. Indeed, any device capable of communicating with the network access device 52 while the device 52 is operating according to its provisioned configuration may be responsible for communicating with the device 52 and deactivating the timer 125. In fact, the control logic 63 can initiate deactivation of the timer 125 once it has been able to verify, while operating under the control of the operational control settings 99, that communication with remote devices is successful.

It should also be noted that it is not necessary for the default configuration of the network access device 52 to be the original configuration of the device 52. In this regard, as described above for the preferred embodiment, the network access device 52 reverts or defaults to its original configuration in response to an interrupt by the timer 125. That is, in response to an interrupt, the network access device 52 is configured to communicate according to the same techniques previously used by the device 52 during its initial provisioning. As a result, the manager 92 is able to communicate with the device 52 for re-provisioning.

However, if desired, the network access device 52 may be configured to revert or default to another suitable configuration that is different than its original configuration. Thus, when a timer interrupt occurs, it is not necessary for the network access device 52 to communicate with the manager 92 with the techniques identical to those used to communicate during the initial provisioning. In other words, it is not necessary for the default control settings 97 to be utilized to control the device 52 during the initial provisioning of the device 52. Instead, another set of control settings (not shown) stored in the network access device 52 may be utilized to control the device 52 during the initial provisioning.

Furthermore, in the preferred embodiment, as described above, the configuration manager 92 is configured to activate the timer 125 during the same communication session that the manager 92 initially provisions the device 52. However, the manager 92 may activate the timer 125 in a different communication session, if desired, and in other embodiments, it is not necessary for the manager 92 to activate the timer 125. In this regard, another device may be configured to activate the timer in other embodiments. For example, the control logic 63 of the network access device 52 may be configured to activate the timer 125 once the device 52 has been provisioned by the manager 92. Various other techniques for activating the timer 125 may be employed in other embodiments. However, it is desirable to take steps to ensure that the network access device 125 is not re-provisioned in response to the timer 125 unless there is a problem with the operation of the device 52. Such steps may include ensuring that the timer 125 does not generate an interrupt unless sufficient time has elapsed to enable a remote device, such as the configuration manager 92, to establish communication with the device 52 and to deactivate the timer 125.

Also note that it is not necessary to generate an interrupt in order to indicate when re-provisioning is to occur. In this regard, there are various other timing methodologies that may be employed to indicate when a specified amount of time has elapsed. For example, the timer 125 may be configured to assert a flag rather than to generate an interrupt when a specified amount of time has elapsed since activation of the timer 125. The control logic 63 may then periodically check the flag and then begin utilizing the default control settings 97 when the control logic 63 discovers that the flag is asserted. Note that, in such an embodiment, deactivation of the timer 125 may be accomplished by disabling assertion of the flag.

In addition, it should further be noted that there are a variety of methodologies that may be employed by the timer 125 to track time. In the preferred embodiment, the clock 81 generates a time value, and the timer 125 determines when an interrupt is to be generated based on comparisons of the clock's current time value to a calculated time value. In this regard, when activated, the timer 125 adds a particular value to the current time value of the clock 81 to determine the calculated time value. The particular value corresponds to an amount of time that is sufficient for the manager 92 to contact the device 52 and to deactivate the timer 125. The particular value may either be preset within the network access device 52 or may be provided by the manager 92 when activating the timer 125.

In an alternative embodiment, the clock 81 may generate a clock signal, and the timer 125 may be configured to count transitions of the clock signal in order to track time. The timer 125, when activated, may begin counting the transitions and may generate an interrupt after a preset number of transitions have occurred. Various other implementations of the clock 81 and/or timer 125 are possible in other embodiments.

It should be noted that, depending on the differences between the default control settings 97 and the operational control settings 99, it may be necessary to reconfigure the WAN 21 when the network access device 52 transitions from one set of control settings 97 or 99 to the other. For example, the network access device 52 may employ a first protocol in communicating according to the default control settings 97, and the device 52 may employ a second different protocol in communicating according to the operational control settings 97. Further, it may be necessary or desirable for the WAN 21 to adjust how it communicates with the device 52 depending on whether the first or second protocol is being employed by the device 52. The configuration manager 92 may inform the WAN 21 or a service provider of the WAN 21 when such adjustments are warranted. For example, the configuration manager 92 may inform the WAN 21 when the timer 125 expires so that the WAN 21 is aware when the device 52 reverts back to its default control settings 97 if communication with the network has been unsuccessful.

Also note that multiple protocols may be employed in enabling communication between the configuration manager 92 and the network access device 52. For example, TCP/IP may be utilized to communicate between the network access device 52 and the configuration manager 92. However, during the same communication session, another protocol, such as PPP, for example, may be utilized to allow IP communication across the link between the WAN 21 and the network access device 52. Various other techniques for communicating between the configuration manager 92 and the network access device 52 may be employed without departing from the principles of the present invention.

In addition, it should also be noted that a dedicated connection between the configuration manager 92 and the network access device 52 for the initial provisioning of the device 52 is not a necessary feature of the present invention. For example, once the network access device 52 has obtained its IP address, the configuration manager 92 may initiate communication or otherwise communicate with the device 52 utilizing TCP/IP or some other suitable protocol not requiring a dedicated connection by the WAN 21 for communication. Furthermore, as will be described in more detail below, a default route may be established such that the network access device 52 is able to transmit messages to the configuration manager 92 without a dedicated WAN connection and without the device 52 having, prior to installation, specific knowledge of the configuration manager's location with respect to the WAN 21.

In the preferred embodiment, the control logic 63 of the network access device 52 automatically establishes such a default route when it obtains its IP address from the WAN 21. More specifically, when the network access device 52 requests an IP address from the WAN 21 according to PPP or some other suitable protocol, a router (not specifically shown) in the WAN 21 preferably transmits, to the device 52, the IP address of the device 52 as well as the address of the router. The control logic 63 then establishes the default route as pointing to the router.

Moreover, when the network access device 52 is to transmit a message and is not aware of the specific network location where the message is to be sent, the control logic 63 preferably causes the message to be transmitted according to the default route. Therefore, the message is transmitted by the network access device 52 to the WAN router identified by the default route previously established by the control logic 63, as described above. Note that the WAN 21 may be configured by a network service provider to route such a message to the appropriate destination (e.g., the configuration manager 92).

Therefore, when the network access device 52 is to communicate a message to the configuration manager 92 for enabling the device 52 to be provisioned or re-provisioned according to the techniques described above, the control logic 63 may cause the message to be transmitted to the aforementioned router based on the default route previously established by the control logic 63, if the control logic 63 is unaware of the configuration manager's location with respect to the WAN 21. Note that the message may include an identifier that identifies the configuration manager 92, and the WAN 21 may be configured to utilize this identifier to determine that the message is to be routed to the configuration manager 92. The WAN 21 may be further configured to transmit such a message to the configuration manager 92 based on a path defined by data maintained, by a network service provider, within the WAN 21. As a result, the message is able to reach the configuration manager 92 without the device 52 having specific knowledge of the configuration manager's network location.

Note that the control logic 63 may be designed to automatically establish the aforedescribed default route without a user specifying the default route, as described above, or the control logic 63, in other embodiments, may allow a user to specify, after installation of the device 52, the default route that is to be utilized by the network access device 52. If establishing the default route is to be automatic, the control logic 63 may be programmed and/or hardwired during manufacturing to automatically establish the default route once the network access device 52 is installed and powered up.

OPERATION

The preferred use and operation of the communication system 50 and associated methodology are described hereafter.

Initially, the network access device 52 is installed at the customer's premises 55. In this regard, the network access device 52 is connected to the subscriber line 19 and to local equipment 28 residing at the premises 55. Then, the network access device 52 is powered up or, in other words, "turned on." As shown by block 205 of FIG. 5, the network access device 52 establishes a communication session with the configuration manager 92 upon power up. In the preferred embodiment, the network access device 52 and the configuration manager 92 communicate during this communication session using telnet messaging and PPP. Furthermore, utilizing IPCP, the network access device 52 preferably obtains an IP address.

Figure 6:
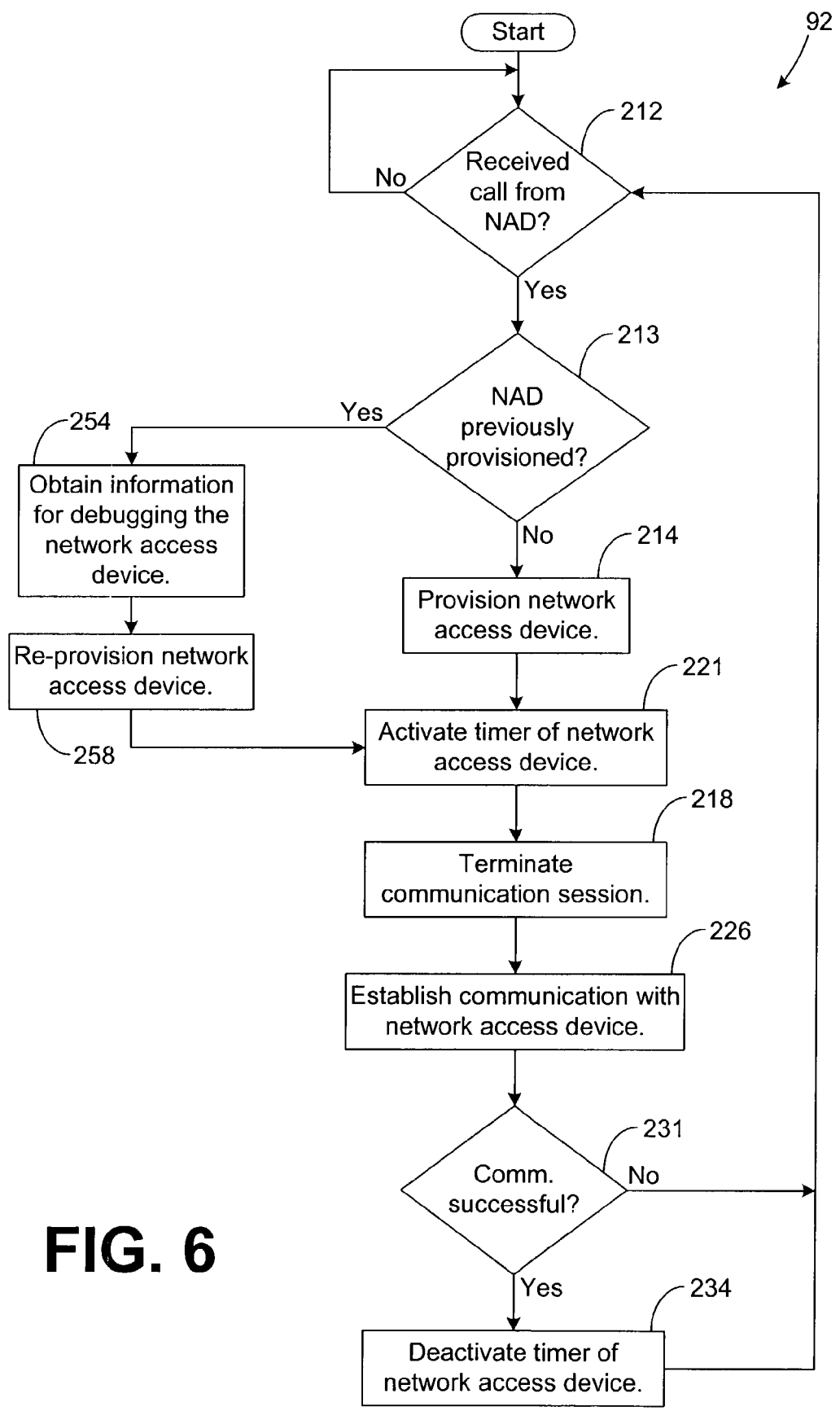
FIG. 6 is a flow chart illustrating an exemplary architecture and functionality of the configuration manager depicted in FIG. 4.

As shown by blocks 212 and 213 of FIG. 6, the configuration manager 92, in response to the establishment of the communication session, determines that the network access device (NAD) 52 has yet to be provisioned since installation. The configuration manager 92, therefore, provisions the network access device 52, in block 214, depending on the environment of the customer's premises 55 and the type of communication desired for servicing the local equipment 28. In provisioning the network access device 52, the configuration manager 92 transmits, to the network access device 52, data that is used by the control logic 63 to set or define the operational control settings 99. Once the provisioning is complete, the configuration manager 92 terminates the communication session, as shown by block 218 of FIG. 6.

However, before the communication session is terminated, the configuration manager 92 preferably activates the timer 125 in block 221 such that the timer 125 generates an interrupt after the communication manager 92 has been given a sufficient amount of time from the occurrence of block 218 to establish communication with the network access device 52 and to deactivate the timer 125. Once the communication session is terminated in block 218, the network access device 52, as shown by blocks 242 and 243 (FIG. 5), begins to operate as provisioned by the configuration manager 92. In this regard, the network access device 52 preferably begins to operate based on the operational control settings 99 set by the configuration manager 92 in block 214 (FIG. 6).

Furthermore, after the communication session is terminated in block 218, the configuration manager 92 attempts to establish communication with the network access device 52, as shown by block 226 of FIG. 6. In the preferred embodiment, the network access device 52 is provisioned to communicate using IP. Thus, the configuration manager 92 preferably transmits messages to the network access device 52 over the WAN 21 using the newly acquired IP address of the network access device 52. If communication with the network access device 52 is successful, the configuration manager 92 preferably deactivates the timer 125 as shown by blocks 231 and 234. As a result, the network access device 52 is not re-provisioned by the configuration manager 92.

Figure 5:
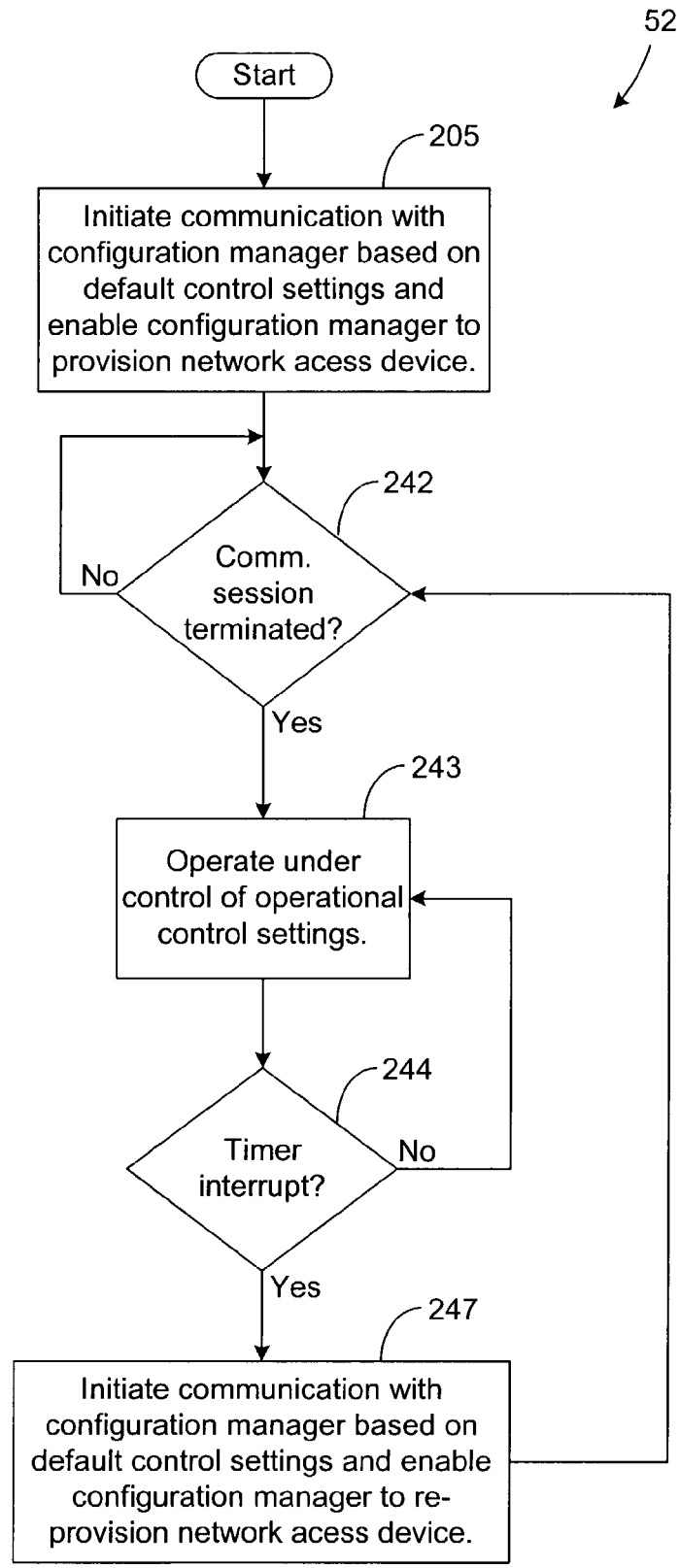
FIG. 5 is a flow chart illustrating an exemplary architecture and functionality of the network access device depicted in FIG. 3.

In this regard, if the timer 125 is deactivated in block 234 of FIG. 6 before a timer interrupt occurs, then a "yes" determination in block 244 (FIG. 5) does not occur. Therefore, the network access device 52 does not revert to its default configuration. That is, block 247 of FIG. 5 is not performed.

However, if communication with the network access device 52 is unsuccessful in block 226 of FIG. 6, then block 234 is skipped. As a result, a timer interrupt eventually occurs. In response, the control logic 63 reverts to its default configuration and initiates communication with the manager 92 utilizing the default control settings 97 rather than the operational control settings 99.

In response, the configuration manager 92 determines, in block 213 of FIG. 6, that the network access device 52 has been previously provisioned. Therefore, the network access device 52 is preferably re-provisioned. In this regard, a "yes" determination in block 213 indicates that the network access device 52 has been previously provisioned and that the configuration manager 92 has been unable to successfully communicate with the network access device 52, as provisioned by the configuration manager 92. Therefore, the configuration manager 92, which may be operating under the control of a user or of the configuration logic 133, preferably collects information for debugging the network access device 52, as shown by block 254. For example, the configuration manager 92 may retrieve some or all of the operational control settings 99, as previously set by the configuration manager 92 during the initial provisioning, to enable a determination as to whether any of the operational control settings 99 were improperly set during the initial provisioning of the device 52.

After performing block 254, the configuration manager 92 attempts to re-provision the network access device 52, as shown by block 258. In this regard, the manager 92 preferably updates the operational control settings 99. Further, during or after the re-provisioning, the manager 92 activates the timer 125 in block 221. If the re-provisioning of the network access device 52 in block 258 is successful for enabling the network access device 52 to communicate with the WAN 21, as re-provisioned by the configuration manager 92 in block 258, then the configuration manager 92 is able to deactivate the timer 125 in block 234 before another timer interrupt is generated.

However, if the re-provisioning of the network access device 52 in block 258 fails to enable the device 52 to communicate successfully with the WAN 21, then the timer 125 generates another interrupt, and the configuration manager 92 may attempt to re-provision the network access device 52 yet again. This process of re-provisioning the network access device 52 and activating the timer 125 is preferably repeated until the configuration manager 92 is able to successfully re-provision the network access device 52 and, therefore, to deactivate the timer 125 in block 234 of FIG. 6.

Note that it is not necessary for the network access device 52 to initiate communication with the configuration for provisioning or re-provision. The following is a description of an alternative embodiment, where the configuration manager 92, rather than the network access device 52, is configured to initiate communication for the provisioning and re-provisioning of the network access device 52.

Initially, the network access device 52 is installed at the customer's premises 55. Then, the network access device 52 is powered up or, in other words, turned "on." As shown by block 252 of FIG. 7, the configuration manager 92 establishes a communication session with the network access device 52 at some point after the network access device 52 has been installed and powered up. The network access device 52 and the configuration manager 92 preferably utilize telnet messaging during this communication session.

Figure 7:
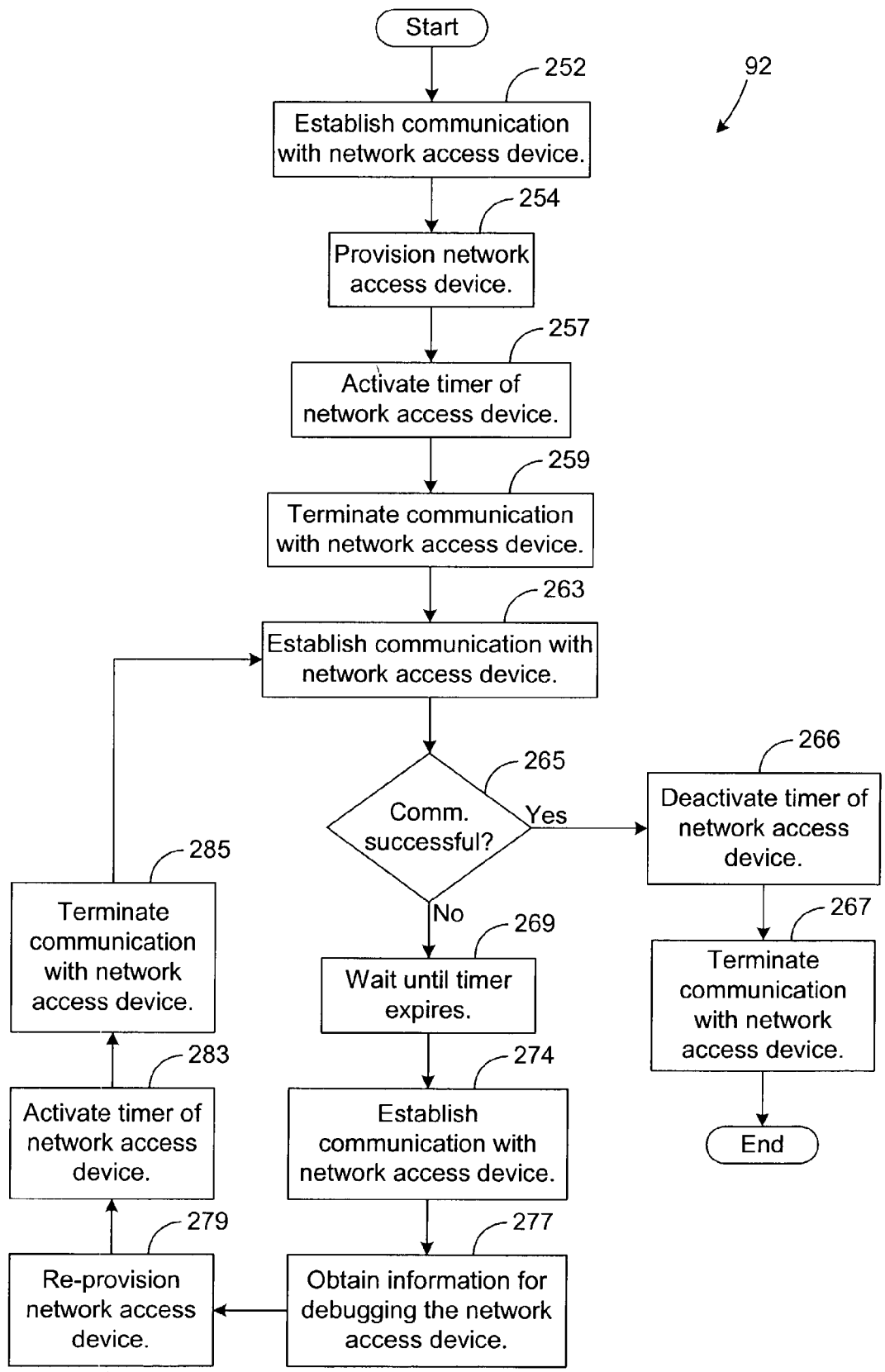
FIG. 7 is a flow chart illustrating another exemplary architecture and functionality of the configuration manager depicted in FIG. 4.

As shown by blocks 254 and 257 of FIG. 7, the configuration manager 92 provisions the network access device 52 and activates the timer 125, as described above. In provisioning the network access device 52, the configuration manager 92 transmits, to the network access device 52, data that is used by the control logic 63 to set or define the operation control settings 99. Once the provisioning of the device 52 is complete, the configuration manager 92 then terminates the communication session, as shown by block 259. At this point, the control logic 63 transitions from utilizing the default control settings 97 to control the operation of the device 52 to utilizing the operation control settings 99.

As shown by block 263, the configuration manager 92 attempts to re-establish communication with the network access device 52 once the control logic 63 of the device 52 has begun operating according to the operational control settings 99. If communication with the network access device 52 is successful, then there is no need to re-provision the device 52, and the configuration manager 92, therefore, deactivates the timer 125 and terminates the current communication session, as shown by blocks 265–267. As described above, deactivation of the timer 125 prevents the control logic 63 from reverting back to the default control settings 97.

However, if the communication with the network access device 52 is unsuccessful, then the configuration manger 265 fails to deactivate the timer 125. In such a case, the configuration manager 92 waits for the timer 125 to expire and, therefore, to generate an interrupt, as shown by blocks 265 and 269. Once this occurs, the control logic 63 begins utilizing the default control settings 97, in lieu of the operational control settings 99, to control operation of the device 52. After the control logic 63 reverts to the default control settings 97, the configuration manager 92 attempts to establish communication with the network access device 52, in block 274, in order to re-provision the network access device 52.

In block 277, the configuration manager 92, as in the embodiment previously described above, collects information for debugging the network access device 52 and, in block 279, re-provisions the device 52. Further, as shown by blocks 283 and 285, the configuration manager 92 activates the timer 125 before terminating the current communication session. Moreover, if the re-provisioning of the network access device 52 is unsuccessful, then another interrupt is generated allowing the configuration manger 92 to re-provision the network access device 52 yet again. However, if the re-provisioning is successful, then the configuration manager 92 successfully establishes communication with the device 52 in block 263 and deactivates the timer 125 in block 266.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A network access device for use in a communication system, comprising:
   memory for storing default control settings for the network access device;
   a timer; and
   logic configured to receive operational control settings transmitted over a wide area network (WAN) from a remote device thereby establishing an operational configuration for the network access device, the logic configured to control operation of the network access device according to the operational configuration while the network access device attempts communication over the WAN, the logic further configured to transition, based on the timer and after the network access device has attempted communication over the WAN, from controlling the operation of the device according to the operational configuration to controlling the operation of the device according to a default configuration that is based on the default control settings.

2. The network access device of claim 1, wherein the logic is configured to control the operation of the device according to the default configuration while the logic is receiving the operational control settings from the remote device.

3. The network access device of claim 1, wherein the timer is configured to notify the logic of expiration of a specified time period provided that the timer is not deactivated prior to the expiration of the specified timer period, and wherein the logic is configured to transition to controlling the operation of the device according to the default configuration in response to a notification from the timer that the specified timer period has expired.

4. A communication system, comprising:
   a communication network;
   a network access device communicatively coupled to the communication network; and
   a configuration manager located remotely from the network access device, the configuration manager configured to provision the network access device via communication with the network access device over the communication network thereby establishing an operational configuration for the network access device,
   wherein the network access device is configured to automatically implement a predefined configuration if the network access device is unable to communicate over the network while operating pursuant to the operational configuration thereby enabling the network access device to be remotely re-provisioned.

5. The system of claim 4, wherein the network access device is configured to automatically implement the predefined configuration based on a timer.

6. The system of claim 4, wherein the network access device is configured to automatically establish a default route and to communicate with the configuration manager via the default route.

7. The system of claim 4, wherein the network access device comprises a timer, the timer configured to cause the network access device to implement the predefined configuration once a specified amount of time has elapsed since activation of the timer unless the timer is deactivated prior to the end of the specified amount of time.

8. The system of claim 7, wherein the configuration manager is configured to activate the timer during a communication session with the network access device.

9. The system of claim 7, wherein the timer is activated based on whether the configuration manager has provisioned the network access device.

10. The system of claim 7, wherein the configuration manager is configured to set the specified amount of time.

11. The system of claim 7, wherein the specified amount of time is sufficient for allowing a remote device to deactivate the timer between the end of the communication session and the end of the specified amount of time.

12. The system of claim 4, wherein the network access device has an identifier that identifies the network access device with respect to other network access devices communicating over the network, wherein the network access device is configured to automatically implement the predefined configuration after attempting to communicate over the network using the identifier if the network access device is unable to communicate over the network while operating pursuant to the operational configuration.

13. A communication system, comprising:
    a communication network;
    a network access device communicatively coupled to the communication network; and
    a configuration manager located remotely from the network access device, the configuration manager configured to provision the network access device during a communication session with the network access device over the communication network thereby establishing an operational configuration for the network access device,
    wherein the network access device comprises a timer, the timer configured to cause the network access device to automatically implement a predefined configuration if a specified time period expires before the timer is deactivated, the specified time period including a sufficient amount of time, subsequent to the communication session, for enabling a remote device to contact the network access device and to cause deactivation of the timer, wherein the remote device is configured to contact the network access device over the network to deactivate the timer.

14. The system of claim 13, wherein the network access device is configured to communicate with the configuration manager during the communication session pursuant to the predefined configuration.

15. The system of claim 13, wherein the time period is specified by the configuration manager.

16. The system of claim 13, wherein the configuration manager is configured to activate the timer during the communication session.

17. A network access device, comprising:
    memory for storing a set of operational control settings and a set of default control settings for the network access device; and
    logic configured to store, in the memory, the operational control settings based on data received from a remote device via a wide area network (WAN), the logic configured to control the network access device based on the operational control settings during a specified time period while the network access device is attempting to communicate over the WAN, the logic further configured to begin controlling the network access device based on the default control settings in lieu of the operational control settings in response to a determination that the specified time period expired without the network access device receiving, from the WAN, an indication that communication with the WAN is enabled during the specified time period when the logic is controlling the network access device based on the operational control settings.

18. The device of claim 17, wherein the logic is configured to control the network access device based on the default control settings while the network access device is receiving the data from the network.

19. The device of claim 17, wherein the device further comprises a timer configured to notify the logic when the specified time period expires, wherein the timer is deactivated in response to the indication.

20. The device of claim 19, wherein the logic is configured to automatically establish a default route and to communicate with the remote device via the default route.

21. A network access device, comprising:

memory for storing a set of operational control settings and a set of default control settings for the network access device; and logic configured to store, in the memory, the operational control settings based on data received from a remote device via a wide area network (WAN), the logic configured to control the network access device based on the operational control settings while the network access device is attempting to communicate over the WAN and to begin controlling the network access device based on the default control settings in lieu of the operational control settings in response to a determination that the network access device is unable to communicate over the WAN based on the operational control settings, thereby enabling the network access device to be remotely re-provisioned.

22. The device of claim 21, wherein the device comprises a timer configured to determine when a specified time period expires, the logic configured to make the determination, based on the timer, if the specified time period expires without the network access device receiving, from the WAN, an indication that communication with the WAN is enabled during the specified time period when the logic is controlling the network access device based on the operational control settings.

23. The device of claim 22, wherein the timer is deactivated in response to the indication.

24. A method, comprising the steps of:

provisioning a network access device based on data communicated to the network access device via communication between the network access device and a remote device over a network thereby establishing an operational configuration for the network access device;

attempting to establish communication between the network access device and a remote device over the network according to the operational configuration established in the provisioning step;

automatically implementing, subsequent to the attempting step, a predefined configuration for the network access device based on whether the attempted communication is successful;

establishing communication between the network access device and a remote device over the network according to the predefined configuration implemented in the implementing step; and re-provisioning the network access device based on data communicated to the network access device via the communication established in the establishing step if the attempted communication according to the operational configuration is unsuccessful.

25. The method of claim 24, wherein the implementing step is based on a timer.

26. The method of claim 24, further comprising the steps of:

activating a timer; and determining whether a specified amount of time has elapsed since the activating step, wherein the implementing step is performed in response to a determination that the specified amount of time since the activating step has elapsed without the timer being deactivated.

27. The method of claim 26, wherein the activating step is performed during the provisioning step.

28. The method of claim 26, further comprising the step of:

deactivating the timer if the attempted communication according to the operational configuration of the network access device is successful.

29. A method, comprising the steps of:

communicating, via a network access device, with a remote device via a network;

receiving, at the network access device, operational control settings from the remote device;

provisioning the network access device based on the received operational control settings thereby establishing an operational configuration for the network access device;

controlling the network access device according to the operational configuration;

implementing, subsequent to the controlling step, a default configuration for the network access device based on a timer; and controlling the network access device according to the default configuration implemented in the implementing step.

30. The method of claim 29, further comprising the step of:

controlling the network access device during the communicating step according to the default configuration.

31. The method of claim 29, further comprising the step of:

activating the timer;

determining whether a specified amount of time has expired since the activating step; and determining whether the timer has been deactivated since the activating step, wherein the implementing step is performed based on the determining steps.

* * * * *